United States Patent
Molyneux

(10) Patent No.: US 10,534,427 B1
(45) Date of Patent: Jan. 14, 2020

(54) VIRTUAL REALITY SYSTEM FOR PROVIDING INDIVIDUALS WITH CUSTOMIZED LIVE EXPERIENCES

(71) Applicant: Timothy B. Molyneux, Las Vegas, NV (US)

(72) Inventor: Timothy B. Molyneux, Las Vegas, NV (US)

(*) Notice: Subject to any disclaimer, the term of this patent is extended or adjusted under 35 U.S.C. 154(b) by 0 days.

(21) Appl. No.: 16/120,411

(22) Filed: Sep. 3, 2018

Related U.S. Application Data

(63) Continuation of application No. 15/624,375, filed on Jun. 15, 2017, now Pat. No. 10,067,558, which is a continuation of application No. 14/791,527, filed on Jul. 6, 2015, now Pat. No. 9,684,371, which is a continuation of application No. 13/352,037, filed on Jan. 17, 2012, now Pat. No. 9,077,865, which is a continuation of application No. 11/000,830, filed on Dec. 1, 2004, now Pat. No. 8,120,655.

(51) Int. Cl.
| | | |
|---|---|---|
| H04N 7/18 | (2006.01) | |
| G06F 3/01 | (2006.01) | |
| G06T 19/00 | (2011.01) | |
| H04N 5/232 | (2006.01) | |
| H04H 20/38 | (2008.01) | |

(52) U.S. Cl.
CPC ............ *G06F 3/011* (2013.01); *G06F 3/014* (2013.01); *G06T 19/006* (2013.01); *H04H 20/38* (2013.01); *H04N 5/232* (2013.01); *H04N 7/181* (2013.01)

(58) Field of Classification Search
CPC ..................................................... H04N 7/18
USPC ................................................. 348/142–160
See application file for complete search history.

(56) References Cited

U.S. PATENT DOCUMENTS

| | | |
|---|---|---|
| 5,448,291 A | 9/1995 | Wickline |
| 5,490,784 A | 2/1996 | Carmein |
| 5,594,498 A | 1/1997 | Fraley |
| 5,625,410 A | 4/1997 | Washino et al. |
| 5,682,196 A | 10/1997 | Freeman |
| 5,695,406 A | 12/1997 | Park |
| 5,714,997 A | 2/1998 | Anderson |
| 5,737,505 A | 4/1998 | Shaw et al. |
| 5,795,228 A | 8/1998 | Trumbull et al. |
| 6,219,045 B1 | 4/2001 | Leahy et al. |
| 6,386,985 B1 | 5/2002 | Rackham |
| 6,409,599 B1 | 6/2002 | Sprout et al. |

(Continued)

*Primary Examiner* — Anand S Rao
(74) *Attorney, Agent, or Firm* — Patterson Intellectual Property Law, P.C.; Gary L. Montle

(57) ABSTRACT

An interactive system and method of the present invention provides a customized experience to individual spectators of a live performance. An input device receives a performance parameter selected by a spectator, and physical features of the spectator are scanned into a processor. Real time data collectors are associated with performers in the live performance, wherein the processor receives the performance parameter from the input device and real time performance data from the real time data collectors, and generates an individually customized real time performance based on the performance parameter and the physical features of the spectator as superimposed with the real time performance data, and further provides the customized real time performance to a virtual reality device for real time presentation to the spectator.

18 Claims, 1 Drawing Sheet

(56) References Cited

U.S. PATENT DOCUMENTS

| | | | |
|---|---|---|---|
| 6,937,295 B2 * | 8/2005 | Islam | H04N 7/183 348/143 |
| 6,959,419 B2 | 10/2005 | Taniwaki | |
| 7,555,766 B2 | 6/2009 | Kondo et al. | |
| 2001/0032127 A1 | 10/2001 | Lewis | |

* cited by examiner

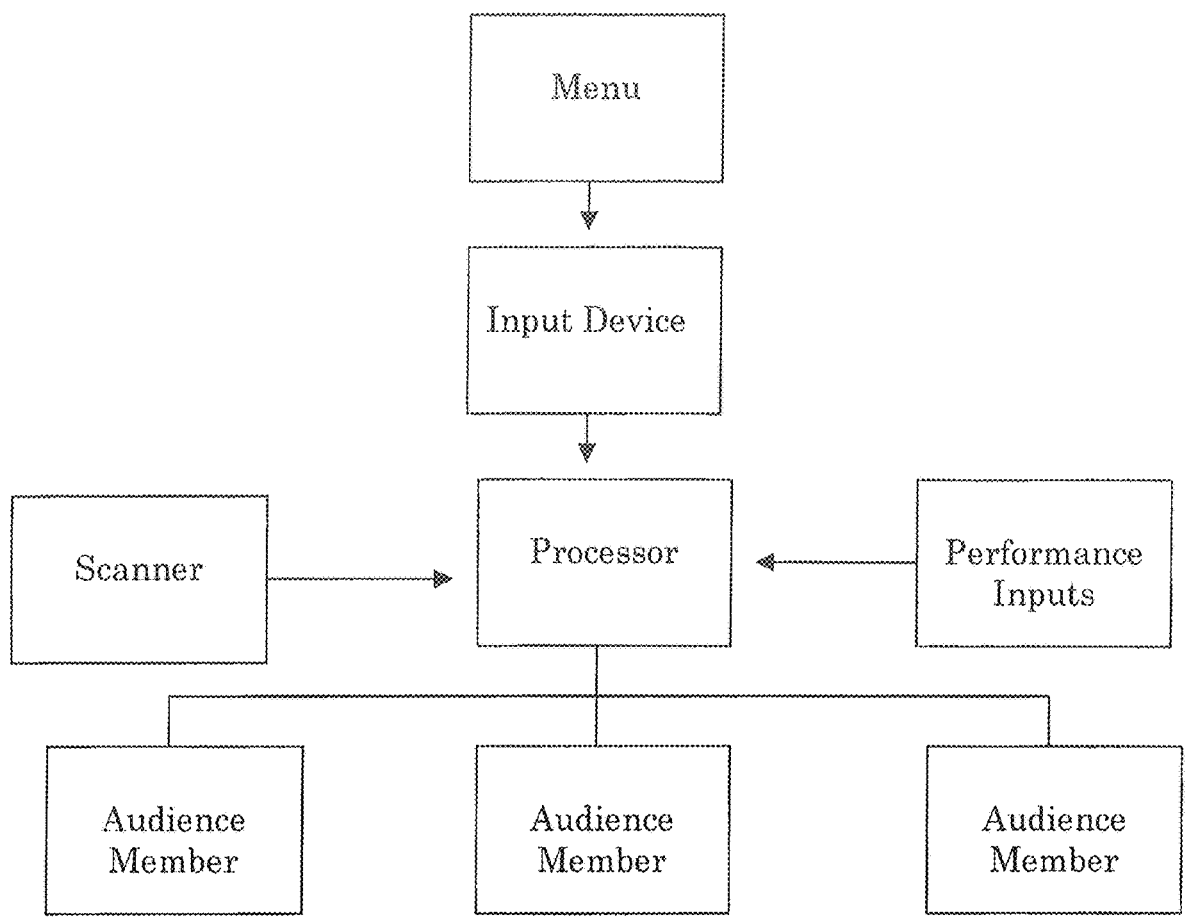

VIRTUAL REALITY SYSTEM FOR PROVIDING INDIVIDUALS WITH CUSTOMIZED LIVE EXPERIENCES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation of U.S. patent application Ser. No. 15/624,375, filed Jun. 15, 2017 as a continuation of U.S. patent application Ser. No. 14/791,527, now U.S. Pat. No. 9,684,371, filed Jul. 6, 2015 as a continuation of U.S. patent application Ser. No. 13/352,037, now U.S. Pat. No. 9,077,865, filed Jan. 17, 2012 as a continuation of U.S. patent application Ser. No. 11/000,830, now U.S. Pat. No. 8,120,655, filed on Dec. 1, 2004.

BACKGROUND OF THE INVENTION

The present invention relates generally to the presentation of a live performance which makes use of "virtual reality-type" concepts to provide an interactive and altered perspective view for spectators. By "virtual reality" is meant an altered sensory experience which differs from that which would otherwise be experienced. The inventive system permits a customizable experience for individual spectators.

Live theatrical performances generally involve one or more actors or performers on a stage which faces or is surrounded by an audience comprising of individual audience members. The juxtaposition of stage and audience defines the perspective experienced by each audience member through the so-called "fourth wall", the imaginary wall between the stage and the audience, which the performers on stage treat as an actual divider to give the audience the impression of viewing action in a closed room. Individual audience members experience the theatrical performance based on their individual view of the performers on the stage through this fourth wall. Even in productions where the fourth wall is breached such as by performers directly addressing the audience or venturing out into audience areas, an audience member's positioning still determines his or her view of the proceedings.

Likewise, an individual audience member's experience is limited by selections made by the producers, director, or other creative individuals involved in the production. In other words, certain scenery and costumes are selected and other aspects of the production's appearance and presentation are selected without the control or input of individual audience members. Moreover, these selections are made for the audience as a whole and not customized for individual audience members. Thus, each member of the audience is required to view the same stylistic elements as every other audience member regardless of personal preferences or creative notions.

Although interactive productions have been staged where audience members vote or otherwise select from among options with respect to scenes and/or endings, the choices are made by the audience as a whole and not customizable by individual audience members. Consequently, if the audience as a whole decides a scene should proceed in a certain manner in such an interactive production, each audience member is thereby obliged to experience that particular manner of proceeding. Thus, while nominally interactive, individual choice falls prey to the group's decisions.

What is desired, therefore, is an interactive live performance whereby individual spectators can select and/or alter their respective viewpoints or experience during the production.

BRIEF SUMMARY OF THE INVENTION

The present invention provides an interactive live performance where each spectator is provided with one or more "virtual reality" devices which function to permit a customizable experience for that individual spectator and thereby combine the features of a live experience with those of virtual reality games, etc.

Exemplary of such devices are virtual reality goggles, which block out all light from outside the goggles and project an image to the wearer which substitutes the projected image for the actual environment he or she is in, thereby creating a "virtual" reality. Another such device is one or a pair of virtual reality gloves, which can provide sensory details to the wearer, such as heat and cold. In one embodiment of the inventive system, each of the performers during the performance can have on his or her person a miniature broadcast camera such that individual audience members can select the perspective offered by individual performers. In other words, by using virtual reality goggles, an audience member can select a perspective of Actor A and, thus, view the action through the "eyes" of Actor A by viewing through the camera worn by Actor A. Likewise, another audience member can view the performance through the perspective of Actor B, and so on, so that, indeed, audience members sitting next to each other can actually be viewing the performance from entirely different perspectives. Moreover, an audience member can be permitted to switch during the performance such that he or she is thereafter viewing the performance from a different actor's prospective. In addition, cameras can be positioned at different locations on or around the stage, such that audience members can view the performance from these different static locations, rather than through the perspective of individual performers.

This can be accomplished through feeding the signals from the respective cameras mounted on the performers through a processor that directs the signal to individual audience members in response to selections made by the audience member. The signals can be either wirelessly transmitted or through hard-wired connections on to processors or receivers at audience seats. An audience member can either make a selection upon entering the theater such that the particular selection made is associated with the audience member's seat number and the appropriate signal sent to the virtual reality goggles associated with that seat number. More preferably, a selection device can be available at each seat such that an audience member can select any perspective performer at various points during the performance. The selection is electronically transmitted to the processor (again either wirelessly or through hard-wired connection), which thereby sends the appropriate signal (or perspective) to the selecting audience member. Alternatively, the respective selections available to audience member can be made through an internet site which can be accessed by, e.g., ticket holders, prior to entering the theater.

In another embodiment of the invention, which can be either substituted for or in addition to the earlier described embodiment, the view provided to an audience member can be customized as to scenery, costuming, or other stylistic elements of the productions. In other words, the theatrical performance can be performed in front of blank screens, or so called "blue screens" or "green screens" such that different scenery elements can be displayed on the screens when viewed through the virtual reality goggles.

Thus, one audience member can perhaps select as the location for the performance a castle, whereas another audience member can select, for instance, a garden. For the first audience member, his or her virtual reality goggles can then display castle scenery displayed on the background screens behind the performers, whereas the second audience member can have garden scenery displayed. Again, audience members sitting next to each other can view the live performance in entirely different settings. Moreover, the performers can be wearing costumes having sensors or other devices which permit the display of different elements thereon when viewed through virtual reality goggles, so that the costuming can be individually selected by audience members and customized such that the appropriate costumes are displayed based on the scenery selected by the audience member.

In a further embodiment, audience member's features can be scanned into a processor, such as when the audience member enters the theater. That audience member's features can then be displayed on one or more of the performers during the performance, such that the audience member is viewing him- or herself in one of the performers' roles. When an audience member is viewing the performance from the perspective of a different performer, he or she can be watching him or herself displayed on a first performer. Again, this can be customized for individual audience members such that each audience member is viewing him- or herself on stage.

Other virtual reality elements can also be included within the audiences' experiences. For instance, audience members can also wear virtual reality gloves or other elements of clothing which can provide sensory experiences such as heat, cold, etc., in response to experiences felt by individual performers. In this way, if an actor picks up a cold glass, the cold sensation can be provided to individual audience members through the virtual reality gloves; if an actor touches a hot object, heat can be experienced by individual audience members.

Other "virtual reality" effects can also be included such that blowers or water sprayers, etc., can be positioned near each seat or over the audience as a whole to duplicate environmental conditions supposedly experienced by the performers during the performance. Again, if one of the performers is supposedly experiencing a breeze, individual audience members associating themselves with that actor can also experience a breeze if a blower is associated with individual seats, whereas nearby audience members would not experience the same breeze.

Accordingly, it is an object of the present invention to provide an interactive theatrical performance.

It is another object of the present invention to provide a theatrical performance which can be customized according to audience members' individual desires.

It is yet another object of the present invention to provide an interactive theatrical performance where individual audience members can view the performance through the perspective of individual performers during the performance.

It is still another object of the present invention to provide an interactive theatrical performance whereby individual audience members can select stylistic elements of the performance independent of the selections of other audience members.

It is a further object of the present invention to provide an interactive theatrical performance whereby individual audience members can experience environmental and/or sensory elements of the performance assertedly experienced by individual performers, or from different locations, selected on an independent and customizable basis.

These objects and others which will be apparent to the skilled artisan upon review of the following description can be accomplished by providing a theatrical performance for relaying data from at least one performer to the audience, which includes a processor, at least one data collector positioned on the at least one performer and remotely connected to the processor; and at least one display device, such as a video or audio display device, remotely connected to the processor to display processed data from the processor. Advantageously, the data collector obtains data substantially similar to data perceived by the at least one performer, and the processor receives the data from the at least one data collector and transmits the data to the at least one display device. The processed data is displayed to one or more of the members of the audience, preferably in real time (i.e., relatively instantaneously), such as by a plurality of secondary processors remotely connected to the processor to modify the collected audio and visual data.

In another embodiment of the invention, the audio and visual data and the additional audio and visual data are processed into a plurality of performance sets of data during the theatrical performance; and each audience member (spectator) can separately experience each performance set of data. Preferably, each spectator can independently select one of the performance sets of data to experience; more preferably, each spectator programs one of the individual processors to individually modify the collected audio and visual data.

It is to be understood that both the foregoing general description and the following detailed description provide embodiments of the invention and are intended to provide an overview or framework of understanding the nature and character of the invention as it is claimed. The accompanying drawing is included to provide a further understanding of the invention and is incorporated in and constitutes a part of the specification. The drawing illustrates an embodiment of the invention, and together with the description, serves to describe the principles and operations of the invention.

BRIEF DESCRIPTION OF THE SEVERAL VIEWS OF THE DRAWINGS

FIG. 1 is a flowchart illustrating the operation of one embodiment of the present invention.

DETAILED DESCRIPTION OF THE INVENTION

The theatrical performance around which the invention of the above-captioned application can be produced can be any type of theatrical performance, including those ranging from dramatic play through comedy through musical. Indeed, the inventive system can create an entirely new class of theatrical performance. Most preferably, the performance is a dramatic play or comedy. In practice, a menu of selections is made available to audience members as illustrated as 20 in FIG. 1. The menu can be electronic or on paper and provides the selections available to each audience member, such as from which actor the audience member's perspective is to be taken, through scenery or costuming selections. The menu can be available upon entry into the theater or at each individual seat. In addition, an input device designated 30 is used to input each individual audience member's selection into a processor 40. Input device 30 can be actuated by a host or hostess or by the individual audience member him- or herself. Indeed menu 20 and input device 30 can be combined into one unit with a touch pad or other similar actuator to permit an audience member to enter his or her choices. In a preferred embodiment, a scanner 50 can be used to input characteristics of individual audience members such as facial features, etc., and fed into processor 40. Most preferably, scanner 50 is present at the entrance of the theater in which the performance is to be held, with individual audience members having the required features scanned into scanner 50 as he or she enters.

Selections from input device 30 and, when employed, data from scanner 50, are associated with each individual audience member such as, for instance, via ticket seat number, and fed into processor 50. Processor 40 also obtains performance inputs which can be data from cameras worn by individual performers, static cameras situated about the stage or other areas of the theater, environmental cues experienced by individual performers, sensory experiences from individual performers, etc. Processor 40 then provides the appropriate data to individual audience members.

Individual signals can be sent to audience members through the use of a multiplexer associated with processor 40. Most preferably, each individual audience member has a processor at his or her seat (not shown) which obtains a signal from processor 40 and communicates the selections made by each individual audience member by that individual audience member, scanned in characteristics and performance inputs, to provide the selected experience to individual audience member 62, 64, 66, etc.

More particularly, if audience member 62 selected a castle scene, had his or her physical characteristics scanned in and assigned to actor A and wished to view the performance from the perspective of actor B, then each of those parameters can be provided to virtual reality goggles associated with the seat at which audience member 62 is seated. Thus, the audience member 62 can assume the view of performer B and observe him or herself in the role of performer A in a castle scene through virtual reality goggles.

Other virtual reality effects can also be communicated to audience member 62 from processor 40 (such as through an individual processor located at the seat of audience member 62 such as hot or cold inputs through virtual reality gloves, breezes, rain, etc. These individual effects can be repeated for each audience member 62, 64, 66, etc., on an individual and customizable basis.

Thus, for the first time, a truly interactive and independent customizable theatrical performance can be provided where each audience member can select elements of the production to be observed including perspective, scenery, costuming, or other aspects of the production independent of other audience members. If menu 20 and input device 30 are located at audience member's seats, these choices can even be altered and amended during the performance.

The above description is intended to enable to person skilled in the art to practice the invention. It is not intended to detail or alter possible variations any modifications that would become apparent to a skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A system for providing an interactive entertainment experience to a viewer, said system comprising:
   at least one virtual reality device associated with the viewer;
   each said virtual reality device comprising one or more displays;
   each said virtual reality device further comprising one or more processors configured to receive data corresponding to the entertainment experience;
   an input device configured to receive one or more customization preferences of the viewer in relation to the entertainment experience;
   one or more servers configured to provide or make available virtual reality sensory data to the viewer's virtual reality device based on the viewer's customization preferences;
   wherein the viewer's customization preferences may include one or more of a visual perspective of the user, or an ability to enable or disable one or more virtual reality effects.

2. The system of claim 1, wherein the user may provide customization preferences using a menu comprising a list of available customization preferences.

3. The system of claim 1, wherein the user may provide customization preferences to the server via an Internet website.

4. The system of claim 1, further comprising one or more data collectors positioned dynamically on one or more of the performers in the interactive entertainment experience.

5. The system of claim 4, wherein one or more of the viewer's available customization preferences is to view data from the one or more data collectors.

6. The system of claim 1, further comprising one or more data collectors positioned substantially statically for viewing one or more performers.

7. The system of claim 6, wherein at least one of the one or more data collectors is positioned to provide a visual perspective similar to that of a live spectator of the entertainment experience.

8. The system of claim 1, further comprising one or more data collectors positioned to provide a visual perspective not ordinarily available to a live spectator of the entertainment experience.

9. The system of claim 1, wherein the server may cause visual elements to be superimposed over the visual perspective of the viewer or over one or more of the performers.

10. The system of claim 9, wherein the superimposed elements are responsive to one or more customization preferences of the viewer.

11. The system of claim 10, wherein the superimposed elements are based at least in part on one or more parameters selected by the user, wherein said selectable parameters comprise a stylistic or aesthetic element associated with one or more persons or objects presented in the setting, or one or more physical features of at least one participant or performer in the entertainment experience.

12. The system of claim 1, wherein one or more of said selectable parameters may be selected by the user in real-time during the entertainment experience.

13. The system of claim 1, said system being further configured to receive data corresponding to the physical features of the user and generate data for display by the virtual reality device based at least in part on said data corresponding to the physical features of the user.

14. The system of claim 1, further comprising at least one virtual reality glove.

15. The virtual reality glove of claim 14, wherein said glove provides feedback to the user corresponding at least in part to the data received by the virtual reality device.

16. The virtual reality glove of claim 15, said feedback comprising tactile feedback.

17. The virtual reality glove of claim 15, said feedback comprising thermal feedback.

18. The virtual reality glove of claim 14, wherein said glove enables the user to provide one or more inputs to the server.

* * * * *